United States Patent
Du et al.

(10) Patent No.: US 12,247,901 B1
(45) Date of Patent: Mar. 11, 2025

(54) SOIL LAYER DETECTION DRILLING DEVICE

(71) Applicant: POWERCHINA SEPCO1 ELECTRIC POWER CONSTRUCTION CO., LTD., Jinan (CN)

(72) Inventors: Chuanguo Du, Jinan (CN); Jiyong Pang, Jinan (CN); Gaojun Qi, Jinan (CN); Di Tang, Jinan (CN); Tao Chen, Jinan (CN)

(73) Assignee: POWERCHINA SEPCO1 ELECTRIC POWER CONSTRUCION CO., LTD., Jinan (CN)

( * ) Notice: Subject to any disclaimer, the term of this patent is extended or adjusted under 35 U.S.C. 154(b) by 0 days.

(21) Appl. No.: 18/945,415

(22) Filed: Nov. 12, 2024

Related U.S. Application Data (63) Continuation of application No. PCT/CN2023/127452, filed on Oct. 30, 2023.

Foreign Application Priority Data

Mar. 1, 2023 (CN) .......................... 202310181685.3

(51) Int. Cl.
  *G01N 1/14*    (2006.01)
  *E21B 3/00*    (2006.01)
  *G01N 1/04*    (2006.01)

(52) U.S. Cl.
  CPC ................ *G01N 1/04* (2013.01); *E21B 3/00* (2013.01)

(58) Field of Classification Search
  CPC .... G01N 1/04; G01N 1/03; E21B 3/00; E21B 7/027; E21B 49/02
  (Continued)

(56) References Cited

U.S. PATENT DOCUMENTS

| | | |
|---|---|---|
| 2009/0114402 A1 | 5/2009 | Mocivnik et al. |
| 2018/0334856 A1 | 11/2018 | Fontana et al. |
| 2019/0291153 A1 | 9/2019 | Vandenbruwane |

FOREIGN PATENT DOCUMENTS

| | | | |
|---|---|---|---|
| CN | 208795531 U | | 4/2019 |
| CN | 214309588 U | * | 9/2021 |

(Continued)

OTHER PUBLICATIONS

Internation Search Report of PCT/CN2023/127452, Mailed Jan. 23, 2023.

*Primary Examiner* — Robert R Raevis (57) ABSTRACT

A soil layer detection drilling device includes a drilling cylinder, and a soil-sampling assembly is provided inside the drilling cylinder. When the soil is drilled, equipment is in a vertical state, a controller is turned on to control a rotary motor to rotate, and the drilling cylinder is driven to drill the soil with the cooperation of drive wheels and a drive belt. Four slide blocks are evenly distributed around an outer circumference of a sliding disk and are matingly connected with slide grooves provided on an inner wall of the drilling cylinder, so when the drilling cylinder rotates, the soil-sampling assembly also rotates. A conical head first in contact with the ground starts to drill the ground, then the drilling cylinder gradually drills into a soil layer, and the drilling cylinder is idled as the drilling cylinder arrives at a certain depth, to clear soil on auger blades.

10 Claims, 10 Drawing Sheets

(58) Field of Classification Search
USPC ...... 73/863.31, 864, 864.41, 864.43, 864.44, 73/864.45; 175/20, 58
See application file for complete search history.

(56) References Cited

FOREIGN PATENT DOCUMENTS

| | | | |
|---|---|---|---|
| CN | 214952269 U | * | 11/2021 |
| CN | 218512060 U | | 2/2023 |
| CN | 116084931 A | | 5/2023 |
| CN | 219511824 U | * | 8/2023 |
| CN | 219714796 U | * | 9/2023 |

* cited by examiner

SOIL LAYER DETECTION DRILLING DEVICE

CROSS-REFERENCE TO RELATED APPLICATIONS

This application is a continuation of International Patent Application No. PCT/CN2023/127452 with a filing date of Oct. 30, 2023, designating the United States, now pending, and further claims priority to Chinese Patent Application No. 202310181685.3 with a filing date of Mar. 1, 2023. The content of the aforementioned applications, including any intervening amendments thereto, is incorporated herein by reference.

TECHNICAL FIELD

The present invention particularly relates to the technical field of soil layer drilling devices, and in particular to a soil layer detection drilling device.

BACKGROUND

At present, tools commonly used for obtaining soil samples include soil augers, shovels and trowels. The soil auger includes a drill bit and a handle made of a hard material (steel or hard plastic). A soil sampler meets the requirements of whole layer, equal amount and convenience of soil-sampling, solves the problem of accurately collecting the soil samples which is difficult to achieve for soil fertilizer work such as soil testing and formula fertilizer application and soil monitoring, and can be used for sampling in different soil textures.

Chinese Patent Publication No. CN215178773U discloses a soil-sampling device, and the soil-sampling device employs a support frame. A frame body of the support frame is provided with a penetration hole, a guide cylinder is provided with a guide hole communicating with the penetration hole, a booster rod of the sampling assembly passes through the penetration hole and the guide hole, a sampler is detachably connected to an end portion of the booster rod and is provided with a sampling groove, and a booster cone is connected to an end portion of the sampler away from the booster rod.

The soil-sampling device in the above patent is based on the principle of sampling: when the sampler is inserted into the soil layer at a preset depth, the booster rod is rotated and soil in the soil layer enters the sampling clamping groove, at this time the sampler is extracted from the soil layer by the booster rod, and the sampler is removed from an end portion of the booster rod, so that the soil-sampling operation can be completed.

As can be seen from the above process: the sampling device mentioned above cannot continue to detect and sample downward after being filled with soil, and this sampling method can only sample the soil layer at a certain depth; whether soil pollution control, planting shed area soil detection or garden planting soil detection cannot stop at a superficial soil composition analysis, it is necessary to detect the soil between half a meter and one meter to analyze the soil composition, thereby making a reasonable decision; taking soil pollution control as an example, the pollution degree of the soil surface layer is not the same as the pollution index of the deep soil, and for this reason, it is necessary to carry out continuous multi-point detection of the deep soil, so on one hand, those pollutants in the soil that are the fastest in terms of leaching efficiency, and those pollutants that have the greatest degree of contamination are detected, and on the other hand, the comprehensive analysis of soil treatment effects at a later stage is facilitated; and to this end, equipment capable of drilling deep soils and capable of deep multi-point sampling the soil is provided.

SUMMARY

An objective of the present invention is to provide a soil layer detection drilling device to solve the technical problems that the existing sampling device mentioned above cannot continue to detect and sample downward after being filled with soil, and this sampling method can only sample the soil layer at a certain depth, as proposed in the above background technology.

To achieve the foregoing objective, the present invention provides the following technical solution.

A soil layer detection drilling device includes a drilling cylinder, and drive wheels are matingly mounted at the top of the drilling cylinder; two drive wheels are provided, and the other drive wheel is matingly connected with an output shaft of a rotary motor; a soil-sampling assembly is provided inside the drilling cylinder; the soil-sampling assembly includes a sliding disk, and a conical head is connected at the bottom of the sliding disk by two connecting rods that are symmetrically disposed; a screw rod is connected between the sliding disk and the conical head by a bearing, and an upper end of the screw rod penetrates above the sliding disk and is matingly connected with an output shaft of the drive motor by a coupling; and a soil-sampling member and a jacking member are matingly mounted on the screw rod.

As a further technical solution of the present invention, the soil-sampling member includes a nut sleeve, the nut sleeve is threadedly connected with the screw rod, a swing arm is connected to the nut sleeve by a rotating shaft, and a soil-sampling cylinder is provided at the end of the swing arm; an auxiliary arm is movably connected to a middle position of the swing arm by a rotating shaft; the auxiliary arm is connected with a fixing base by a rotating shaft; and the fixing base is welded to one side of the connecting rod.

As a further technical solution of the present invention, an inclined port is formed at an opening end of the soil-sampling cylinder; a through hole is formed at one end of the swing arm; and the soil-sampling cylinder snaps into the through hole.

As a further technical solution of the present invention, an included angle between the swing arm in a contracted state and the center axis of the screw rod is 30 degrees, the swing arm is in an extended state when the soil-sampling cylinder samples the soil, and the included angle between the swing arm and the center axis of the screw rod is 35-40 degrees.

As a further technical solution of the present invention, the jacking member includes a sliding sleeve, the sliding sleeve is sleeved onto and slidingly connected with the screw rod, a jacking arm is movably connected to one side of the sliding sleeve by a rotating shaft, and a rubber ball is matingly mounted at the end of the jacking arm; a side support arm is connected to a middle position of the jacking arm by a rotating shaft; the side support arm is connected with a connecting base by a rotating shaft; and the connecting base is welded to the connecting rod.

As a further technical solution of the present invention, a length of the jacking arm is less than a length of the swing arm; when an included angle between the swing arm in a contracted state and the center axis of the screw rod is 30 degrees, the jacking arm is in a contracted state, at this time the rubber ball is not in contact with the inner wall of the drilling cylinder, and when the included angle between the swing arm and the center axis of the screw rod is less than 30 degrees, the nut sleeve pushes the sliding sleeve to slide upwardly, at this time the jacking arm is unfolded, and the rubber ball rests against and is in snap connection with the inner wall of the drilling cylinder.

As a further technical solution of the present invention, auger blades for drilling the soil layer are helically arranged outside the drilling cylinder.

As a further technical solution of the present invention, an I-shaped fixing cylinder is provided inside the drilling cylinder, and the I-shaped fixing cylinder is matingly connected with the drilling cylinder by a bearing; and the I-shaped fixing cylinder is provided with a through hole in its middle, and a rotary wire connector is matingly mounted in the through hole.

As a further technical solution of the present invention, the I-shaped fixing cylinder is fixedly mounted to a fixing frame, and the fixing frame is further used for fixing the rotary motor.

As a further technical solution of the present invention, slide frames are connected to one side of the fixing frame by bolts, and the slide frames are slidingly connected with the slide rails; two slide rails are provided and fixed to the frame body, a screw rod is provided at the middle position of two slide rails, and both ends of the screw are connected with the frame body and the fixing plate respectively by mounted bearings, and are in drive connection with the lifting motor; and a driving plate is matingly mounted on the screw, and both ends of the driving plate are welded and fixed to the two slide frames.

As a further technical solution of the present invention, the fixing plate is fixed to the two slide rails by bolts, a push handle is welded to an upper end of the fixing plate, and anti-slip sleeves are sleeved onto both ends of the push handle.

As a further technical solution of the present invention, two supports are also fixed to one side of the two slide rails by bolts; and traveling wheels are connected to the two supports by mounted bearings.

As a further technical solution of the present invention, an L-bracket is fixed between the two supports, and a controller is fixedly mounted on the L-bracket; the controller is connected with the rotary motor, the lifting motor and the rotary wire connector by means of wires, respectively; and the rotary wire connector is connected with the drive motor by means of wires.

As a further technical solution of the present invention, the drilling cylinder is provided with a boss, and two clamping grooves are formed in the boss; an annular groove that facilitates snap-fit with the boss is formed in the conical head, and two clamping blocks that are fixed in snap-connection with the clamping grooves are provided in the annular groove.

As a further technical solution of the present invention, a plurality of ribs are evenly distributed outside the conical head.

As a further technical solution of the present invention, four support legs are welded to one side of the frame body, and the support legs are used for support for drilling the soil layer by the whole equipment.

As a further technical solution of the present invention, four slide blocks are evenly distributed around an outer circumference of the sliding disk; and four slide grooves mating with the slide blocks are formed in the inner wall of the drilling cylinder.

As a further technical solution of the present invention, a plurality of soil-sampling members are provided, and a spacing between every two adjacent soil-sampling members is 15-20 cm.

As a further technical solution of the present invention, one end of the rubber ball away from the jacking arm is provided with a flat surface that facilitates jacking an inner wall of the drilling cylinder.

As a further technical solution of the present invention, when the soil layer detection drilling device is in a placement state, the slide rails are parallel to the ground, and at this time the traveling wheels and the push handle are in contact with the ground.

Compared with the prior art, the present invention has the following beneficial effects.

In the present invention, when the soil is drilled, the whole equipment is placed in a vertical state, a controller is then turned on to control the rotary motor to rotate, and the drilling cylinder is driven to drill the soil with the cooperation of the drive wheels and a drive belt. Four slide blocks are evenly distributed around an outer circumference of the sliding disk and are matingly connected with slide grooves formed in an inner wall of the drilling cylinder, so when the drilling cylinder rotates, the soil-sampling assembly also rotates. A conical head first in contact the ground starts to drill the ground, then the drilling cylinder gradually drills into a soil layer, and the drilling cylinder is idled for 20-30 s as the drilling cylinder arrives at a certain depth, to clear soil on auger blades outside the drilling cylinder. Then, the screw rod is driven by the drive motor to rotate 5-10 turns, and at this time the jacking member is released from resting against the inner wall of the drilling cylinder, so that when the drilling cylinder rises, the soil-sampling assembly still can stay in a hole for collecting the soil; in the present invention, when the drilling cylinder rises to a position where the bottom of the drilling cylinder and the sliding disk snap together, then the soil is sampled, at this time the drive motor drives the screw rod to rotate, and the nut sleeve converts a rotational motion of the screw into a linear motion, and at this time, the swing arm moves downwardly at the inner side and lifts upwardly at the outer side while the soil-sampling cylinder is in contact with the inner wall of the hole to achieve the soil-sampling; in the present invention, after the soil-sampling is completed, the drive motor drives the screw rod to rotate in the opposite direction, and the nut sleeve converts the rotational motion of the screw rod into the linear motion and slides upwardly along the screw rod, and at this time the swing arm moves upwardly at the inner side and downwardly at the outer side while contracting the soil-sampling cylinder inside; a lifting motor then drives the screw rod to rotate, and a fixing frame drives slide frames to move down the slide rails, so that the drilling cylinder is sleeved back outside the soil-sampling assembly; subsequently, the drive motor drives the screw rod to continue to rotate, at this time the nut sleeve slides upwardly along the screw rod against the sliding sleeve, and the jacking arm is flipped outwardly with the cooperation of the side support arm until the rubber ball rests against the inner wall of the drilling cylinder, thereby fixing the drilling cylinder and the soil-sampling assembly to facilitate lifting the soil-sampling assembly out of the hole; in the present invention, when collecting the sampled soil, after repeating the above actions that can unfix the drilling cylinder and the soil-sampling assembly, the soil-sampling assembly can be separated out from the drilling cylinder to achieve the collection of soil, which is simple in structure and convenient in operation; in the present invention, as a plurality of soil-sampling members are provided, and a spacing between every two adjacent soil-sampling members is 15-20 cm, and through the above settings, multi-point sampling of the deep layer soil can be achieved, to facilitate the inspectors to analyze the soil of different depths at the same location, so as to make corresponding decisions at a later stage; in the present invention, after use, the whole equipment is flipped 90 degrees, so that the traveling wheels and the push handle are in contact with the ground, thereby facilitating the placement of the equipment; and when the equipment is required to be transferred, the push handle is held to achieve the push transfer of the equipment.

In the drawings: 1—drilling cylinder, 2—soil-sampling assembly, 3—bearing, 4—I-shaped fixing cylinder, 5—rotary wire connector, 6—controller, 7—L-bracket, 8—support, 9—traveling wheel, 10—frame body, 11—support leg, 12—fixing frame, 13—slide frame, 14—screw, 15—slide rail, 16—fixing plate, 17—push handle, 18—rotary motor, 19—drive wheel, 20—lifting motor, 21—sliding disk, 22—connecting rod, 23—conical head, 24—screw rod, 25—soil-sampling member, 26—jacking member, 27—drive motor, 251—nut sleeve, 252—swing arm, 253—auxiliary arm, 254—fixing base, 255—soil-sampling cylinder, 261—sliding sleeve, 262—jacking arm, 263—rubber ball, 264—side support arm, 265—connecting base.

DETAILED DESCRIPTION OF THE EMBODIMENTS

The technical solutions in the embodiments of the present invention are clearly and completely described below in conjunction with the accompanying drawings in the embodiments of the present invention. Apparently, the described embodiments are merely some rather than all of the embodiments of the present invention. Based on the embodiments in the present invention, all other embodiments obtained by a person of ordinary skill in the art without making creative labor fall within the scope of protection of the present invention.

Referring to FIG. 1 to FIG. 10, in an embodiment of the present invention, a soil layer detection drilling device includes a drilling cylinder 1, and drive wheels 19 are matingly mounted at the top of the drilling cylinder 1; two drive wheels 19 are provided, and the other drive wheel 19 is matingly connected with an output shaft of a rotary motor 18; a soil-sampling assembly 2 is provided inside the drilling cylinder 1. The soil-sampling assembly 2 includes a sliding disk 21, and a conical head 23 is connected at the bottom of the sliding disk 21 by two connecting rods 22 that are symmetrically disposed; a screw rod 24 is connected between the sliding disk 21 and the conical head 23 by a bearing, and an upper end of the screw rod 24 penetrates above the sliding disk 21 and is matingly connected with an output shaft of the drive motor 27 by a coupling; and a soil-sampling member 25 and a jacking member 26 are matingly mounted on the screw rod 24.

Figure 1:
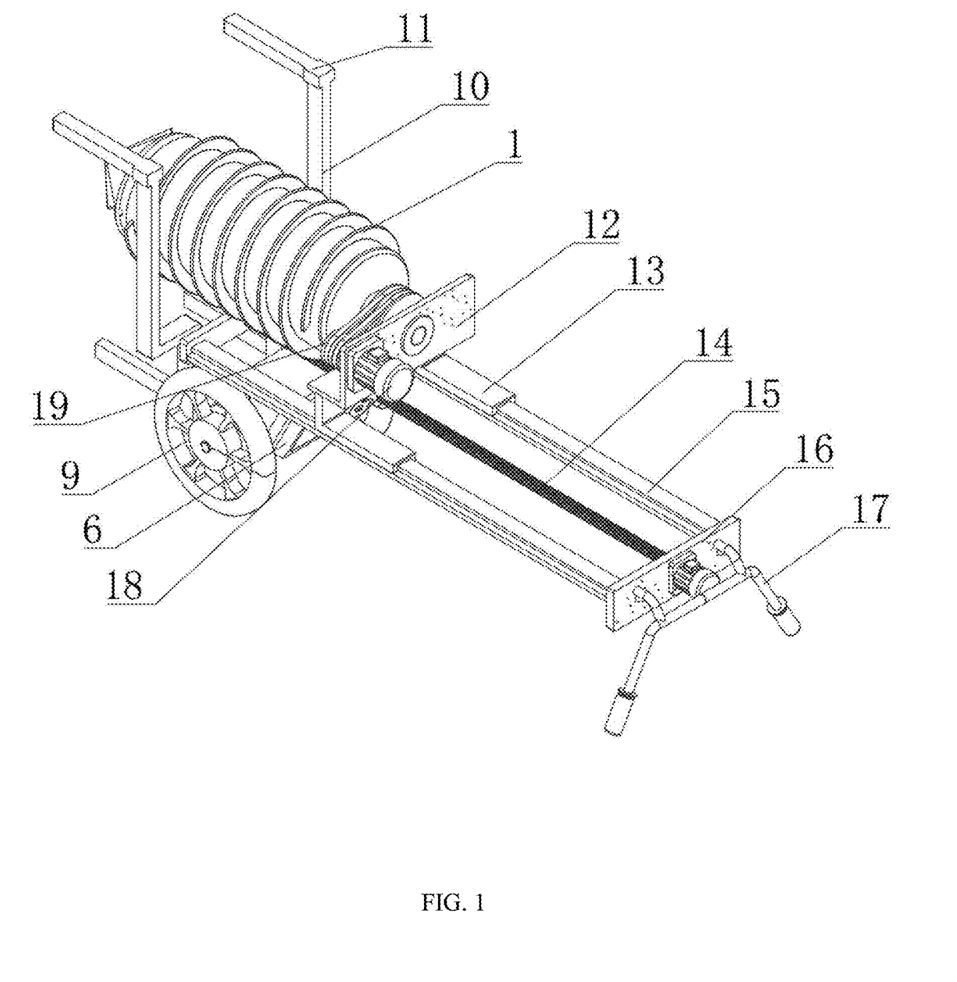
FIG. 1 is a schematic structural diagram of the present invention in a placement state.
Figure 2:
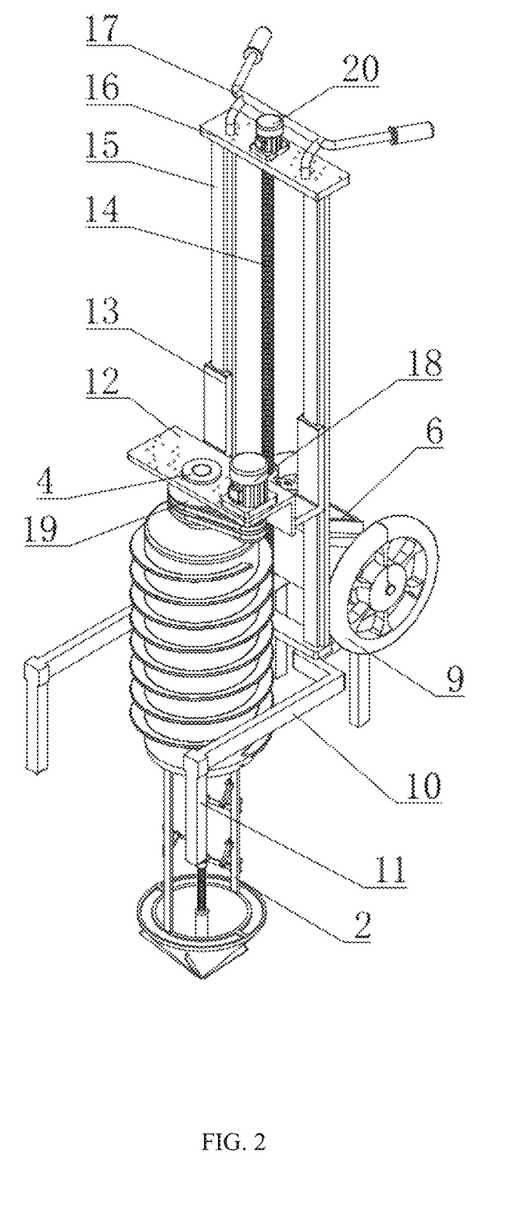
FIG. 2 is a schematic structural diagram of the present invention in a usage state.
Figure 5:
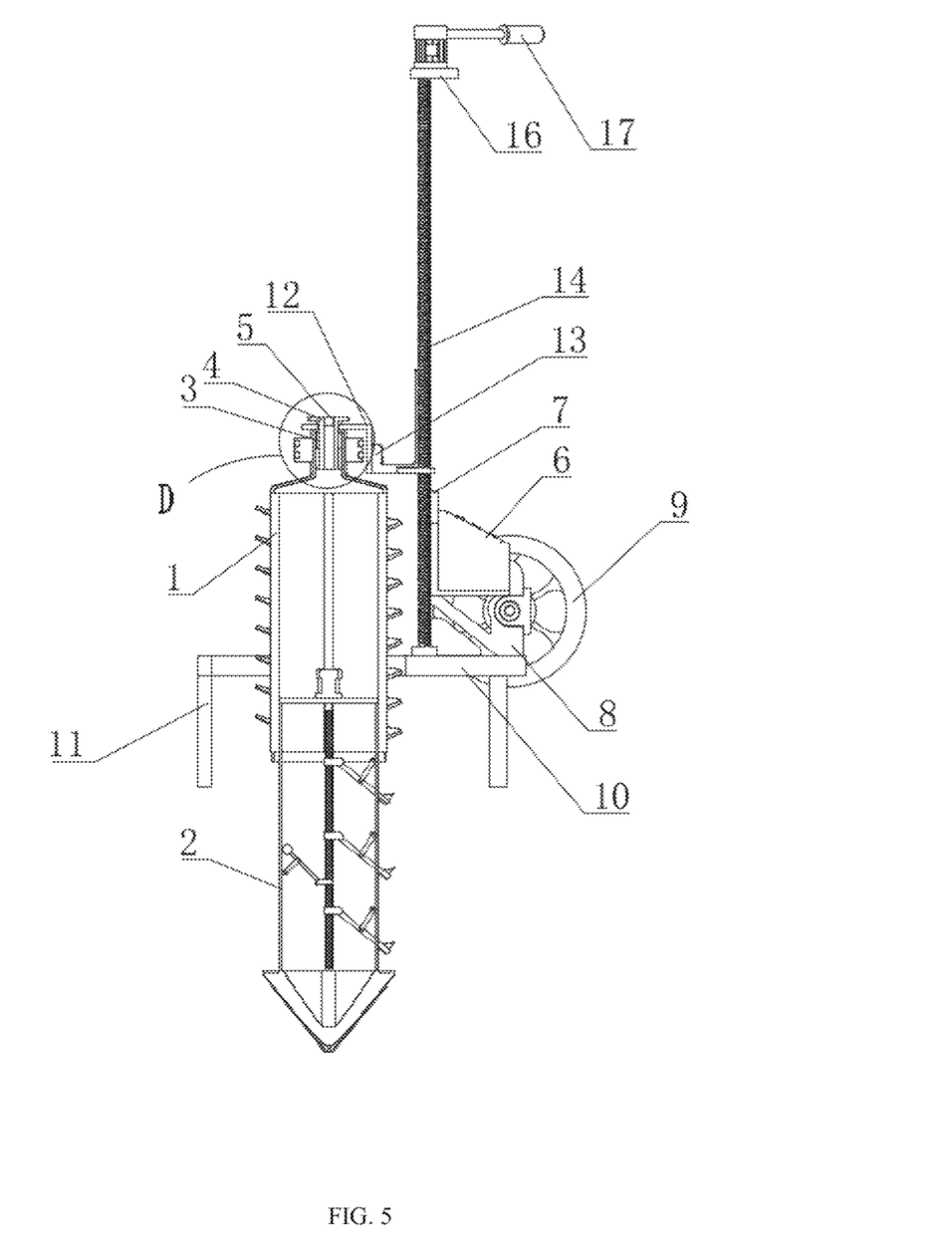
FIG. 5 is an A-A sectional view of FIG. 4 in the present invention.

By adopting the above technical solution, when the soil is drilled, the whole equipment is placed in a vertical state, a controller 6 is then turned on to control the rotary motor 18 to rotate, and the drilling cylinder 1 is driven to drill the soil with the cooperation of the drive wheels 19 and a drive belt. Four slide blocks are evenly distributed around an outer circumference of the sliding disk 21 and are matingly connected with slide grooves provided on an inner wall of the drilling cylinder 1, so when the drilling cylinder 1 rotates, the soil-sampling assembly 2 also rotates. The conical head 23 first in contact with the ground starts to drill the ground, then the drilling cylinder 1 gradually drills into a soil layer, and the drilling cylinder 1 is idled for 20-30 s as the drilling cylinder 1 arrives at a certain depth, to clear soil on auger blades outside the drilling cylinder 1. Then, the screw rod 24 is driven by the drive motor 27 to rotate 5-10 turns, at this time the jacking member 26 is released from resting against the inner wall of the drilling cylinder 1, so that when the drilling cylinder 1 rises, the soil-sampling assembly 2 still can stay in a hole for collecting the soil.

Figure 6:
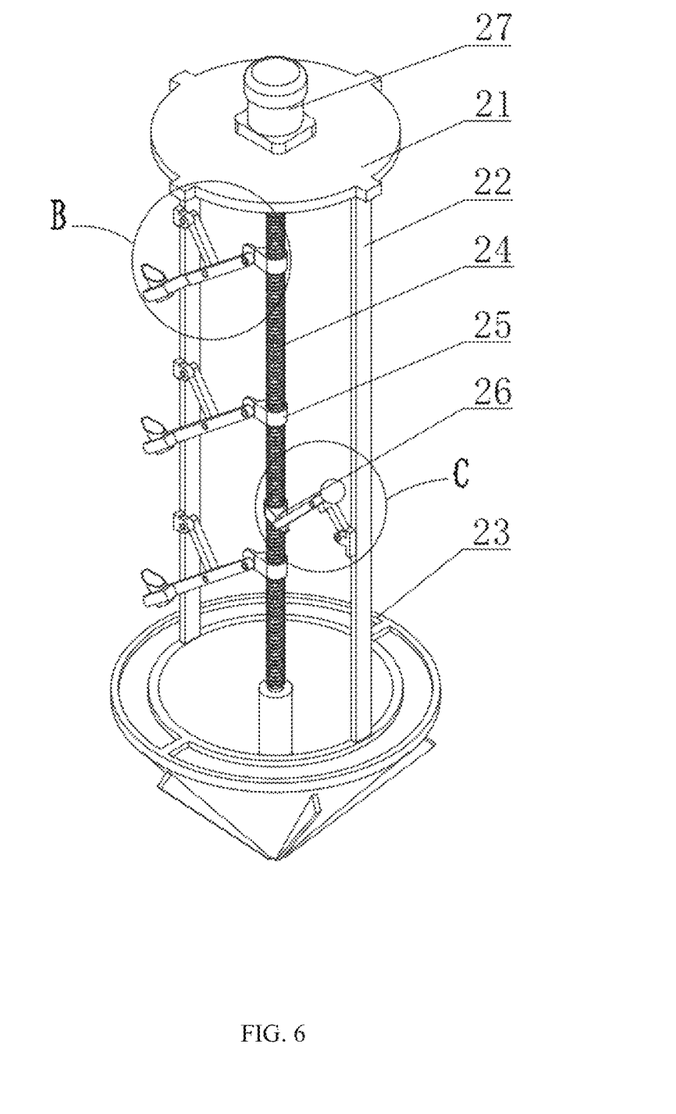
FIG. 6 is a schematic structural diagram of a soil-sampling assembly of the present invention.
Figure 7:
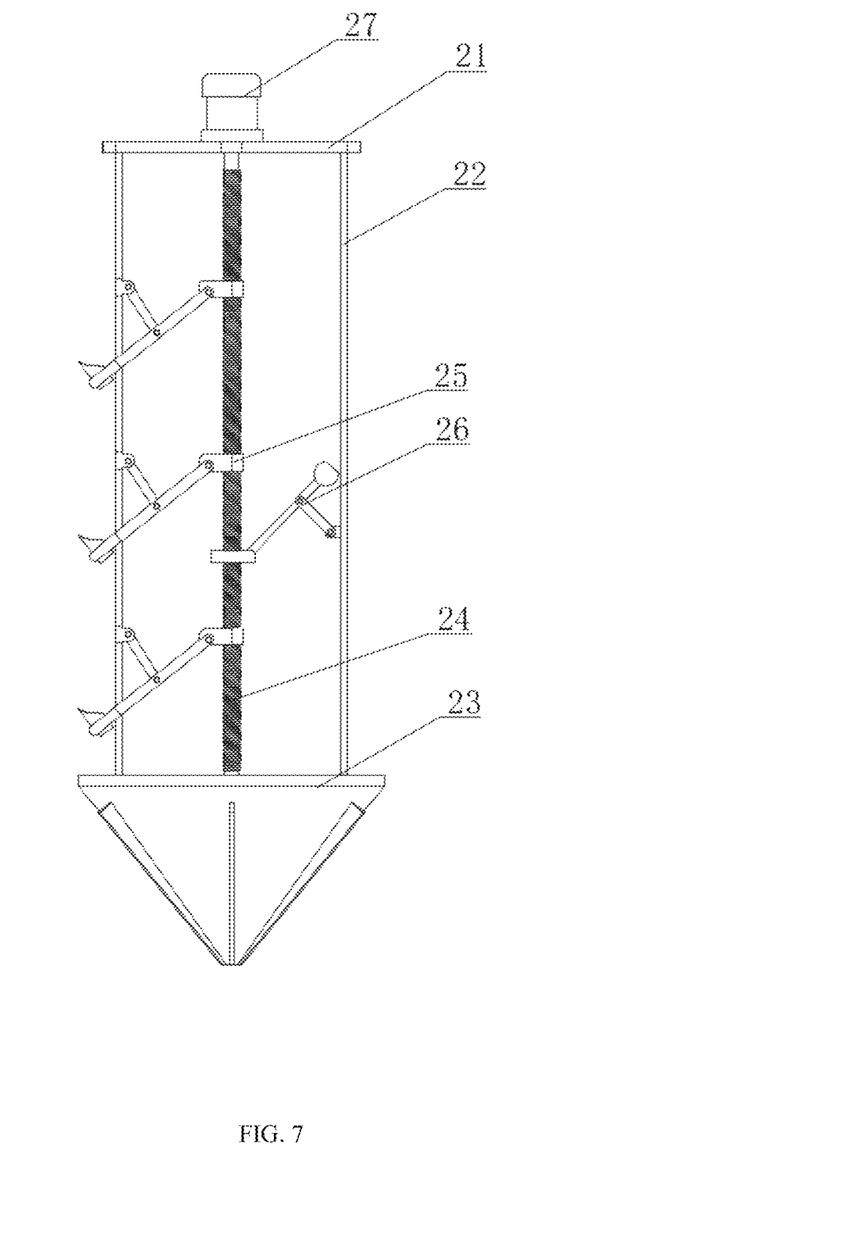
FIG. 7 is a front view of FIG. 6 in the present invention.
Figure 8:
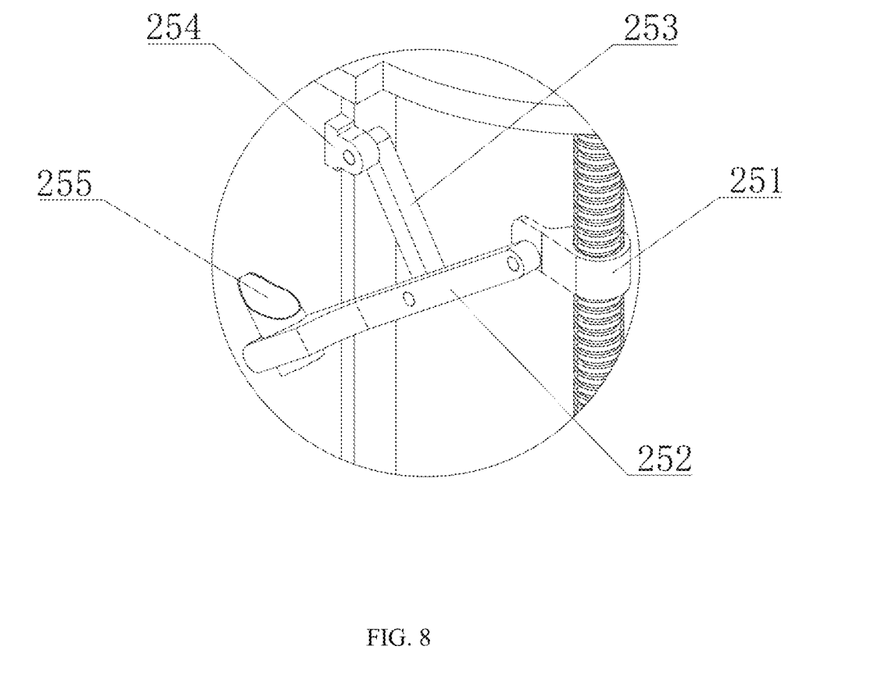
FIG. 8 is an enlarged schematic view of FIG. 6 at B in the present invention.

In this embodiment, the soil-sampling member 25 includes a nut sleeve 251, the nut sleeve 251 is threadedly connected with the screw rod 24, a swing arm 252 is connected to the nut sleeve 251 by a rotating shaft, and a soil-sampling cylinder 255 is provided at the end of the swing arm 252; an auxiliary arm 253 is movably connected to a middle position of the swing arm 252 by a rotating shaft; the auxiliary arm 253 is connected with a fixing base 254 by a rotating shaft; and the fixing base 254 is welded to one side of the connecting rod 22.

More specifically, an inclined port is formed at an opening end of the soil-sampling cylinder 255; a through hole is formed at one end of the swing arm 252; and the soil-sampling cylinder 255 snaps into the through hole.

By adopting the above technical solution, when the drilling cylinder 1 rises to a position where the bottom of the drilling cylinder and the sliding disk 21 snap together, then the soil is sampled, at this time the drive motor 27 drives the screw rod 24 to rotate, the nut sleeve 251 converts a rotational motion of the screw 24 into a linear motion, and at this time, the swing arm 252 moves downwardly at the inner side and lifts upwardly at the outer side while the soil-sampling cylinder 255 is in contact with the inner wall of the hole to achieve the soil-sampling.

In this embodiment, an included angle between the swing arm 252 in a contracted state and the center axis of the screw rod 24 is 30 degrees, the swing arm 252 is in an extended state when the soil-sampling cylinder 255 samples the soil, and the included angle between the swing arm 252 and the center axis of the screw rod 24 is 35-40 degrees.

By adopting the above technical solution, an included angle of 30 degrees can ensure that the drilling cylinder 1 is sleeved within the soil-sampling assembly 2; and an included angle of 35-40 degrees can sample the soil.

Figure 9:
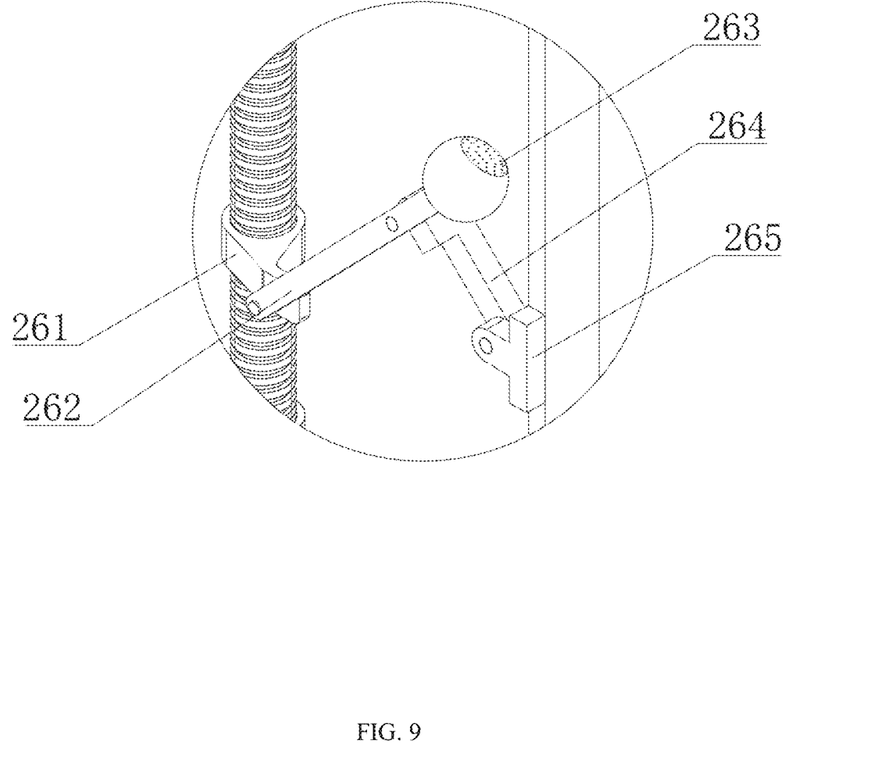
FIG. 9 is an enlarged schematic view of FIG. 6 at C in the present invention.

In this embodiment, the jacking member 26 includes a sliding sleeve 261, the sliding sleeve 261 is sleeved onto and slidingly connected with the screw rod 24, a jacking arm 262 is movably connected to one side of the sliding sleeve 261 by a rotating shaft, and a rubber ball 263 is matingly mounted at the end of the jacking arm 262; a side support arm 264 is connected to a middle position of the jacking arm 262 by a rotating shaft; the side support arm 264 is connected with a connecting base 265 by a rotating shaft; and the connecting base 265 is welded to the connecting rod 22.

By adopting the above technical solution, after the soil-sampling is completed, the drive motor 27 drives the screw rod 24 to rotate in the opposite direction, and the nut sleeve 251 converts the rotational motion of the screw rod 24 into the linear motion and slides upwardly along the screw rod 24, and at this time the swing arm 252 moves upwardly at the inner side and downwardly at the outer side while contracting the soil-sampling cylinder 255 inside; a lifting motor 20 then drives the screw rod 14 to rotate, and a fixing frame 12 drives slide frames 13 to move down slide rails 15, so that the drilling cylinder 1 is sleeved back outside the soil-sampling assembly 2; subsequently, the drive motor 27 drives the screw rod 24 to continue to rotate, at this time the nut sleeve 251 slides upwardly along the screw rod 24 against the sliding sleeve 261, and the jacking arm 262 is flipped outwardly with the cooperation of the side support arm 264 until the rubber ball 263 rests against the inner wall of the drilling cylinder 1, thereby fixing the drilling cylinder 1 and the soil-sampling assembly 2 to facilitate lifting the soil-sampling assembly 2 out of the hole.

In this embodiment, a length of the jacking arm 262 is less than a length of the swing arm 252; when an included angle between the swing arm 252 in a contracted state and a center axis of the screw rod 24 is 30 degrees, the jacking arm 262 is in a contracted state, at this time the rubber ball 263 is not in contact with the inner wall of the drilling cylinder 1, and when the included angle between the swing arm 252 and the center axis of the screw rod 24 is less than 30 degrees, the nut sleeve 251 pushes the sliding sleeve 261 to slide upwardly, and at this time the jacking arm 262 is unfolded, and the rubber ball 263 rests against and is in snap connection with the inner wall of the drilling cylinder 1.

By adopting the above technical solution, a length of the jacking arm 262 is less than a length of the swing arm 252, so that the jacking arm 262 does not rest against and is not in contact with the drilling cylinder 1 when the soil-sampling member 25 is in a normal contracted state.

In this embodiment, auger blades for drilling the soil layer are helically arranged outside the drilling cylinder 1.

By adopting the above technical solution, drilling the soil by the drilling cylinder 1 is facilitated.

Figure 10:
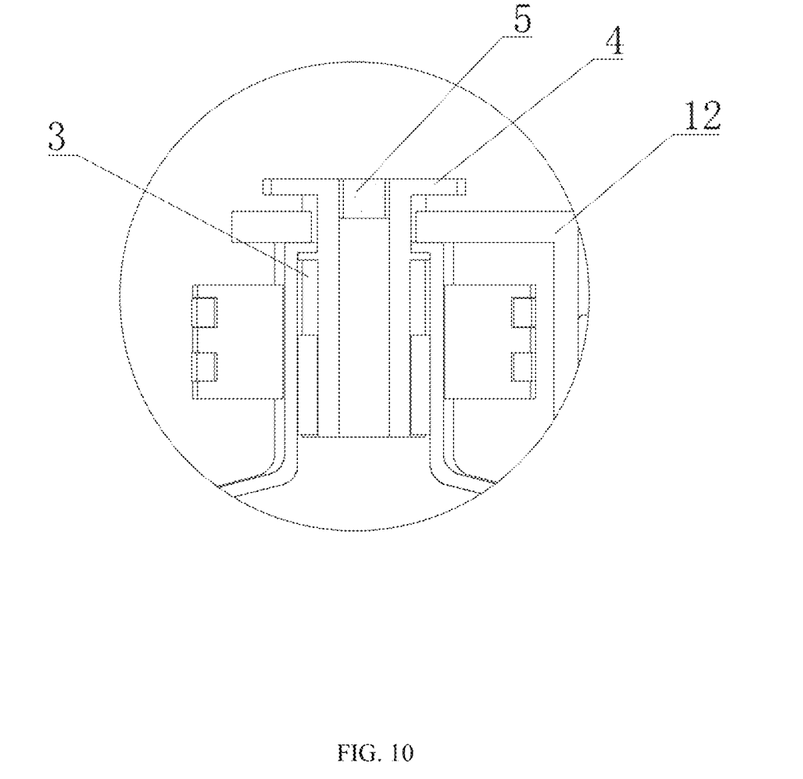
FIG. 10 is an enlarged schematic view of FIG. 5 at D in the present invention.

In this embodiment, an I-shaped fixing cylinder 4 is provided inside the drilling cylinder 1, and the I-shaped fixing cylinder 4 is matingly connected with the drilling cylinder 1 by a bearing; and the I-shaped fixing cylinder 4 is provided with a through hole in the middle, and a rotary wire connector 5 is matingly mounted in the through hole. More specifically, the rotary wire connector 5 is provided to ensure normal power supply to the drive motor 27 when the drilling cylinder 1 and the soil-sampling assembly 2 rotate, and to avoid the occurrence of wire twisting.

In this embodiment, the I-shaped fixing cylinder 4 is fixedly mounted to a fixing frame 12, and the fixing frame 12 is further used for fixing the rotary motor 18.

More specifically, the I-shaped fixing cylinder 4 is connected with the drilling cylinder 1 by a bearing 3, in order to ensure that the rotation of the drilling cylinder 1 is achieved in case that the I-shaped fixing cylinder is fixed, and also have a lifting and pulling effect on the drilling cylinder 1, which facilitates lifting the drilling cylinder 1.

Figure 3:
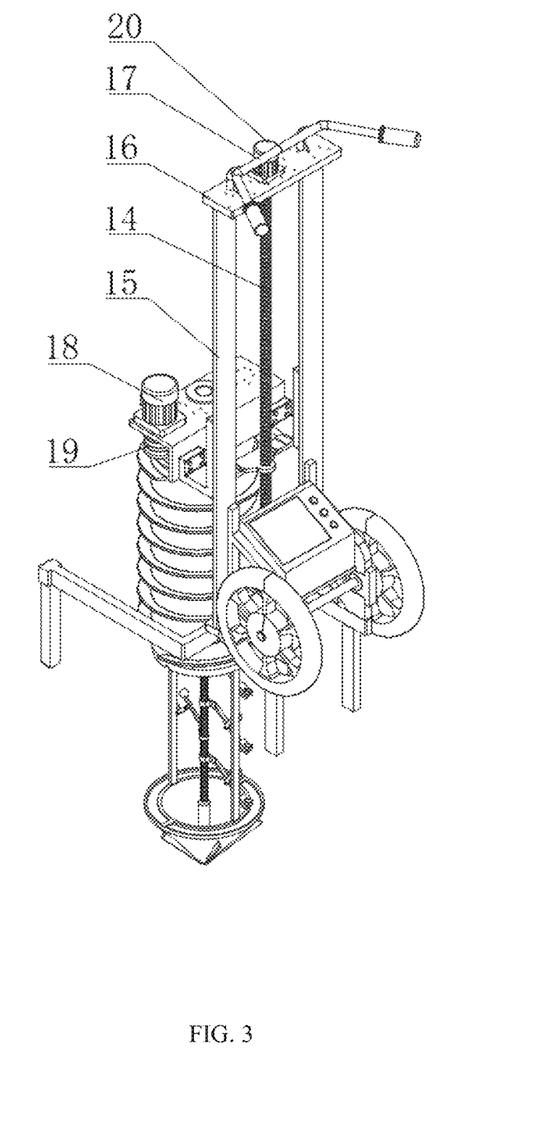
FIG. 3 is a schematic right-side view of FIG. 1 in the present invention.
Figure 4:
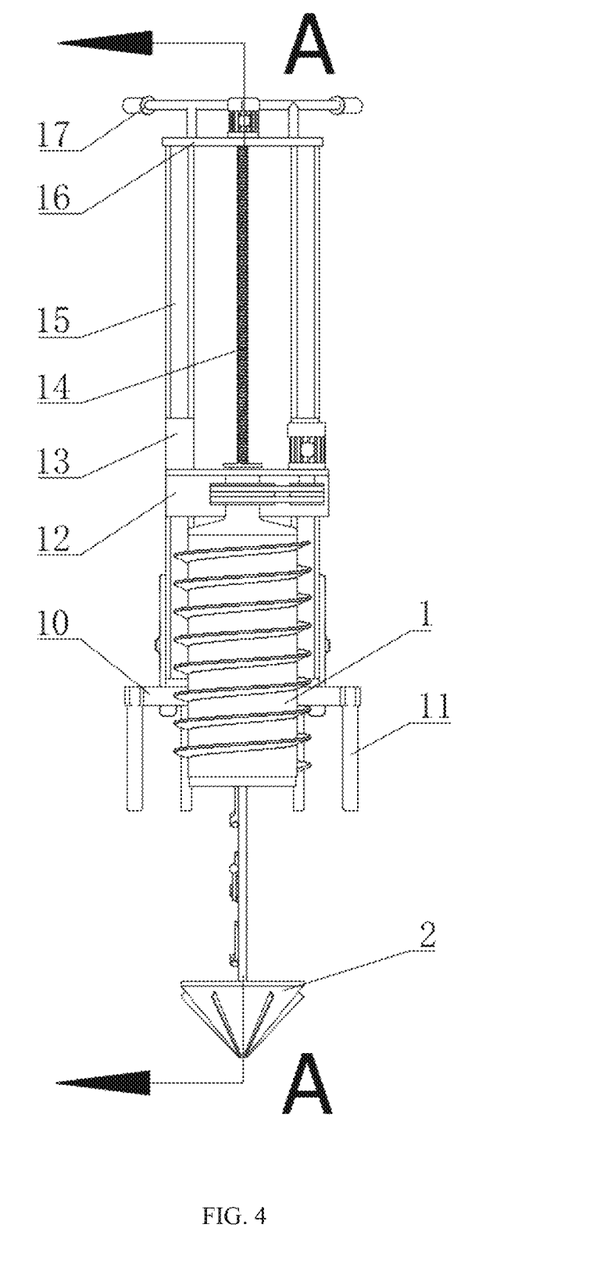
FIG. 4 is a left view of FIG. 2 in the present invention.

In this embodiment, slide frames 13 are connected to one side of the fixing frame 12 by bolts, and the slide frames 13 are slidingly connected with the slide rails 15; two slide rails 15 are provided and fixed to the frame body 10, a screw rod 14 is provided at the middle position of two slide rails 15, and both ends of the screw 14 are connected with the frame body 10 and the fixing plate 16 respectively by mounted bearings, and are in drive connection with the lifting motor 20; and a driving plate is matingly mounted on the screw 14, and both ends of the driving plate are welded and fixed to the two slide frames 13.

By adopting the above technical solution, after the soil-sampling is completed, the lifting motor 20 drives the screw rod 14 to rotate, and the slide frames 13 convert a rotational motion of the screw rod 14 into a linear motion by a driving plate, so as to facilitate lifting out the drilling cylinder 1 and the soil-sampling assembly 2. In this embodiment, the fixing plate 16 is fixed to the two slide rails 15 by bolts, a push handle 17 is welded to an upper end of the fixing plate 16, and anti-slip sleeves are sleeved onto both ends of the push handle 17.

More specifically, two supports 8 are also fixed to one side of the two slide rails 15 by bolts; and traveling wheels 9 are connected to the two supports 8 by mounted bearings.

By adopting the above technical solution, after use, the whole equipment is flipped 90 degrees, so that the traveling wheels 9 and the push handle 17 are in contact with the ground, thereby facilitating the placement of the equipment; and when the equipment is required to be transferred, the push handle 17 is held to achieve the push transfer of the equipment.

In this embodiment, an L-bracket 7 is fixed between the two supports 8, and a controller 6 is fixedly mounted on the L-bracket 7; the controller 6 is connected with the rotary motor 18, the lifting motor 20 and the rotary wire connector 5 by means of wires, respectively; and the rotary wire connector 5 is connected with the drive motor 27 by means of wires.

In this embodiment, the drilling cylinder 1 is provided with a boss, and two clamping grooves are formed in the boss; an annular groove that facilitates snap-fit with the boss is formed in the conical head 23, and two clamping blocks that are fixed in snap-connection with the clamping grooves are provided in the annular groove; and a plurality of ribs are evenly distributed outside the conical head 23.

By adopting the above technical solution, when the drilling cylinder 1 rotates, with the cooperation of the clamping grooves and the clamping blocks, the rotation of the conical head 23 can be achieved, and drilling the soil by the conical head 23 can be achieved.

In this embodiment, four support legs 11 are welded to one side of the frame body 10, and the support legs 11 are used for support for drilling the soil layer by the whole equipment.

By adopting the above technical solution, a more stable supporting state can be provided while the equipment performs drilling and samples the soil.

In this embodiment, four slide blocks are evenly distributed around an outer circumference of the sliding disk 21; and four slide grooves mating with the slide blocks are formed in the inner wall of the drilling cylinder 1.

By adopting the above technical solution, the drilling cylinder 1 and the soil-sampling assembly 2 are enabled to be relatively separated so as to facilitate the soil-sampling.

In this embodiment, a plurality of soil-sampling members 25 are provided, and a spacing between every two adjacent soil-sampling members 25 is 15-20 cm.

By adopting the above technical solution, multi-point sampling of the deep layer soil can be achieved, to facilitate the inspectors to analyze the soil of different depths at the same location, so as to make corresponding decisions at a later stage.

In this embodiment, one end of the rubber ball 263 away from the jacking arm 262 is provided with a flat surface that facilitates jacking an inner wall of the drilling cylinder 1.

By adopting the above technical solution, providing a flat surface on the rubber ball 263 can increase a contact area between the rubber ball 263 and the drilling cylinder 1, thereby improving the jacking effect, and facilitates the soil-sampling assembly 2 to be lifted out along with the drilling cylinder 1.

Further, when the soil layer detection drilling device is in a placement state, the slide rails 15 are parallel to the ground, and at this time the traveling wheels 9 and the push handle 17 are in contact with the ground.

The working principle of the present invention is: when the soil is drilled, the whole equipment is placed in a vertical state, a controller 6 is then turned on to control the rotary motor 18 to rotate, and the drilling cylinder 1 is driven to drill the soil with the cooperation of the drive wheels 19 and a drive belt. Four slide blocks are evenly distributed around an outer circumference of the sliding disk 21 and are matingly connected with slide grooves formed in the inner wall of the drilling cylinder 1, so when the drilling cylinder 1 rotates, the soil-sampling assembly 2 also rotates. A conical head 23 first in contact with the ground starts to drill the ground, then the drilling cylinder 1 gradually drills into a soil layer, and the drilling cylinder 1 is idled for 20-30 s as the drilling cylinder 1 arrives at a certain depth, to clear soil on auger blades outside the drilling cylinder 1. Then, the screw rod 24 is driven by the drive motor 27 to rotate 5-10 turns, and at this time the jacking member 26 is released from resting against the inner wall of the drilling cylinder 1, so that when the drilling cylinder 1 rises, the soil-sampling assembly 2 still can stay in a hole for collecting the soil.

When the drilling cylinder 1 rises to a position where the bottom of the drilling cylinder and the sliding disk 21 snap together, then the soil is sampled, at this time the drive motor 27 drives the screw rod 24 to rotate, the nut sleeve 251 converts a rotational motion of the screw 24 into a linear motion, and at this time, the swing arm 252 moves downwardly at the inner side and lifts upwardly at the outer side while the soil-sampling cylinder 255 is in contact with the inner wall of the hole to achieve the soil-sampling; after the soil-sampling is completed, the drive motor 27 drives the screw rod 24 to rotate in the opposite direction, and the nut sleeve 251 converts the rotational motion of the screw rod 24 into the linear motion and slides upwardly along the screw rod 24, and at this time the swing arm 252 moves upwardly at the inner side and downwardly at the outer side while contracting the soil-sampling cylinder 255 inside; a lifting motor 20 then drives the screw rod 14 to rotate, and a fixing frame 12 drives slide frames 13 to move down slide rails 15, so that the drilling cylinder 1 is sleeved back outside the soil-sampling assembly 2; subsequently, the drive motor 27 drives the screw rod 24 to continue to rotate, at this time the nut sleeve 251 slides upwardly along the screw rod 24 against the sliding sleeve 261, and the jacking arm 262 is flipped outwardly with the cooperation of the side support arm 264 until the rubber ball 263 rests against the inner wall of the drilling cylinder 1, thereby fixing the drilling cylinder 1 and the soil-sampling assembly 2 so as to facilitate lifting the soil-sampling assembly 2 out of the hole.

When the obtained soil is collected and after the above actions that can unfix the drilling cylinder 1 and the soil-sampling assembly 2 is repeated, the soil-sampling assembly 2 can be separated out from the drilling cylinder 1 to achieve the collection of soil, which is simple in structure and convenient in operation.

A plurality of soil-sampling members 25 are provided, and a spacing between every two adjacent soil-sampling members 25 is 15-20 cm, and through the above settings, multi-point sampling of the deep layer soil can be achieved, to facilitate the inspectors to analyze the soil of different depths at the same location, so as to make corresponding decisions at a later stage.

After use, the whole equipment is flipped 90 degrees, so that the traveling wheels 9 and the push handle 17 are in contact with the ground, thereby facilitating the placement of the equipment; and when the equipment is required to be transferred, the push handle 17 is held to achieve the push transfer of the equipment.

It will be evident to those skilled in the art that the present invention is not limited to the details of the foregoing illustrative embodiments, and that the present invention may be embodied in other specific forms without departing from the spirit or essential features thereof. Therefore, the scope of the present invention is limited by the appended claims and not by the foregoing description, and is intended to embrace all variations falling within the meaning and scope of equivalent elements of the claims within the present invention. Any reference numbers in the claims should not be regarded as limiting the involved claims.

What is claimed is:

1. A soil layer detection drilling device, comprising a drilling cylinder (1), wherein two drive wheels (19) are provided with one matingly mounted at a top of the drilling cylinder (1) and the other matingly connected with an output shaft of a rotary motor (18); a soil-sampling assembly (2) is provided inside the drilling cylinder (1);

the soil-sampling assembly (2) comprises a sliding disk (21), and a conical head (23) is connected at a bottom of the sliding disk (21) by two connecting rods (22) that are symmetrically disposed; a screw rod (24) is rotatably connected between the sliding disk (21) and the conical head (23), and an upper end of the screw rod (24) penetrates above the sliding disk (21) and is matingly connected with an output shaft of the drive motor (27) by a coupling; a soil-sampling member (25) and a jacking member (26) are matingly mounted on the screw rod (24);

the soil-sampling member (25) comprises a nut sleeve (251), the nut sleeve (251) is threadedly connected with the screw rod (24), a swing arm (252) is rotatably connected to the nut sleeve (251), and a soil-sampling cylinder (255) is provided at an end of the swing arm (252); an auxiliary arm (253) is rotatably connected to a middle position of the swing arm (252); a fixing base (254) is rotatably connected to the auxiliary arm (253); the fixing base (254) is welded to one side of the connecting rod (22);

an inclined port is provided at an opening end of the soil-sampling cylinder (255); a through hole is provided at one end of the swing arm (252); the soil-sampling cylinder (255) snaps into the through hole;

an included angle between the swing arm (252) in a contracted state and a center axis of the screw rod (24) is 30 degrees, the swing arm (252) is in an extended state when the soil-sampling cylinder (255) samples the soil, and the included angle between the swing arm (252) in the extended state and the center axis of the screw rod (24) is 35-40 degrees; the jacking member (26) comprises a sliding sleeve (261), the sliding sleeve (261) is sleeved onto and slidingly connected with the screw rod (24), a jacking arm (262) is rotatably connected to one side of the sliding sleeve (261), and a rubber ball (263) is matingly mounted at an end of the jacking arm (262); a side support arm (264) is rotatably connected to a middle position of the jacking arm (262); a connecting base (265) is rotatably connected to the side support arm (264); the connecting base (265) is welded to the connecting rod (22);

a length of the jacking arm (262) is less than a length of the swing arm (252); when the included angle between the swing arm (252) in the contracted state and the center axis of the screw rod (24) is 30 degrees, the jacking arm (262) is in a contracted state, and the rubber ball (263) is not in contact with an inner wall of the drilling cylinder (1); and when the included angle between the swing arm (252) and the center axis of the screw rod (24) is less than 30 degrees, the nut sleeve (251) pushes the sliding sleeve (261) to slide upwardly, the jacking arm (262) is unfolded, and the rubber ball (263) rests against and is in snap connection with the inner wall of the drilling cylinder (1).

2. The soil layer detection drilling device according to claim 1, wherein auger blades for drilling the soil layer are helically arranged outside the drilling cylinder (1).

3. The soil layer detection drilling device according to claim 1, wherein an I-shaped fixing cylinder (4) is provided inside the drilling cylinder (1), and the I-shaped fixing cylinder (4) is rotatably connected with the drilling cylinder (1) by a bearing (3); a through hole in defined in a middle of the I-shaped fixing cylinder (4), and a rotary wire connector (5) is matingly mounted in the through hole; and the I-shaped fixing cylinder (4) is fixedly mounted to a fixing frame (12), and the fixing frame (12) is further used for fixing the rotary motor (18).

4. The soil layer detection drilling device according to claim 3, wherein slide frames (13) are connected to one side of the fixing frame (12) by bolts, and the slide frames (13) are slidingly connected with slide rails (15); two slide rails (15) are provided and fixed to a frame body (10), a screw rod (14) is provided at a middle position of the two slide rails (15), and both ends of the screw (14) are rotatably connected with the frame body (10) and a fixing plate (16) respectively, and are in drive connection with a lifting motor (20); a driving plate is matingly mounted on the screw (14), and both ends of the driving plate are welded and fixed to two slide frames (13); and one end of the rubber ball (263) away from the jacking arm (262) is provided with a flat surface that facilitates jacking an inner wall of the drilling cylinder (1).

5. The soil layer detection drilling device according to claim 4, wherein the fixing plate (16) is fixed to the two slide rails (15) by bolts, a push handle (17) is welded to an upper end of the fixing plate (16), and anti-slip sleeves are sleeved onto both ends of the push handle (17); and when the soil layer detection drilling device is in a placement state, the slide rails (15) are parallel to the ground, and traveling wheels (9) and the push handle (17) are in contact with the ground.

6. The soil layer detection drilling device according to claim 4, wherein two supports (8) are also fixed to one side of the two slide rails (15) by bolts; and the traveling wheels (9) are rotatably connected to the two supports (8).

7. The soil layer detection drilling device according to claim 6, wherein an L-bracket (7) is fixed between the two supports (8), and a controller (6) is fixedly mounted on the L-bracket (7); the controller (6) is connected with the rotary motor (18), the lifting motor (20) and the rotary wire connector (5) by wires, respectively; and the rotary wire connector (5) is connected with the drive motor (27) by wires.

8. The soil layer detection drilling device according to claim 1, wherein the drilling cylinder (1) is provided with a boss, and two clamping grooves are formed in the boss; an annular groove that facilitates snap-fit with the boss is formed in the conical head (23), and two clamping blocks that are fixed in snap-connection with the clamping grooves are provided in the annular groove; and a plurality of ribs are evenly distributed outside the conical head (23).

9. The soil layer detection drilling device according to claim 4, wherein four support legs (11) are welded to one side of the frame body (10), and the support legs (11) are used for supporting the drilling device during drilling into the soil layer.

10. The soil layer detection drilling device according to claim 1, wherein four slide blocks are evenly distributed around an outer circumference of the sliding disk (21); and four slide grooves mating with the slide blocks are formed in the inner wall of the drilling cylinder (1).

* * * * *